US009385928B2

(12) United States Patent  (10) Patent No.: US 9,385,928 B2
Petta et al.  (45) Date of Patent: Jul. 5, 2016

(54) SYSTEMS AND METHODS TO CONTROL WEB SCRAPING

(71) Applicant: Yellowpages.com LLC, Glendale, CA (US)

(72) Inventors: Damon Layton Petta, Upland, CA (US); Bradley Keith Mohs, South Pasadena, CA (US)

(73) Assignee: YellowPages.com LLC, Glendale, CA (US)

( * ) Notice: Subject to any disclaimer, the term of this patent is extended or adjusted under 35 U.S.C. 154(b) by 120 days.

(21) Appl. No.: 14/061,633

(22) Filed: Oct. 23, 2013

(65) Prior Publication Data

US 2014/0047111 A1   Feb. 13, 2014

Related U.S. Application Data

(63) Continuation of application No. 12/122,598, filed on May 16, 2008, now Pat. No. 8,595,847.

(51) Int. Cl.
*H04L 29/06* (2006.01)
*H04L 12/26* (2006.01)
*G06F 17/30* (2006.01)
*G06F 21/55* (2013.01)
*G06Q 30/02* (2012.01)
*G06Q 50/00* (2012.01)

(52) U.S. Cl.
CPC .......... *H04L 43/04* (2013.01); *G06F 17/30864* (2013.01); *G06F 21/552* (2013.01); *G06Q 30/0201* (2013.01); *G06Q 50/01* (2013.01); *H04L 12/26* (2013.01)

(58) Field of Classification Search
CPC ........ H04L 12/26; H04L 43/04; G06Q 50/01; G06Q 30/0201; G06Q 30/02; G06F 17/30864
USPC ............................................. 726/26; 709/224
See application file for complete search history.

(56) References Cited

U.S. PATENT DOCUMENTS

| | | | |
|---|---|---|---|
| 6,662,230 B1 * | 12/2003 | Eichstaedt et al. ............ 709/229 |
| 7,111,144 B2 | 9/2006 | Hardman et al. | |
| 7,454,779 B2 * | 11/2008 | Hughes et al. .................... 726/2 |
| 2002/0042821 A1 | 4/2002 | Muret et al. | |
| 2002/0161778 A1 * | 10/2002 | Linstedt ........................ 707/102 |
| 2003/0033541 A1 | 2/2003 | Edmark et al. | |
| 2003/0099197 A1 | 5/2003 | Yokota et al. | |
| 2003/0172291 A1 | 9/2003 | Judge et al. | |
| 2007/0043849 A1 | 2/2007 | Lill et al. | |

(Continued)

OTHER PUBLICATIONS

Fitzpatrick, Brad; "Distributed Caching with Memcached"; *Linux Journal*; Located at http://www.linuxjournal.com/print/7451; Aug. 1, 2004.

(Continued)

*Primary Examiner* — Chau Le
*Assistant Examiner* — Gary Lavelle
(74) *Attorney, Agent, or Firm* — Alston & Bird LLP

(57) ABSTRACT

Systems and methods to control web scraping through a plurality of web servers using real time access statistics are described. For example, in one embodiment a web request is categorized based at least in part on a type of data access. The web request can be processed based on threshold determinations. The processing can include blocking, delaying, timely replying, or prioritizing a response to the web request.

20 Claims, 5 Drawing Sheets

(56) References Cited

U.S. PATENT DOCUMENTS

| | | | |
|---|---|---|---|
| 2007/0282859 A1* | 12/2007 | Charvet | 707/10 |
| 2008/0114739 A1 | 5/2008 | Hayes | |
| 2008/0304411 A1* | 12/2008 | Ikada et al. | 370/232 |
| 2009/0077233 A1* | 3/2009 | Kurebayashi et al. | 709/224 |
| 2010/0138919 A1 | 6/2010 | Peng et al. | |
| 2010/0332963 A1* | 12/2010 | Ellis et al. | 715/209 |

OTHER PUBLICATIONS

Kabe, Taketo and Masatoshi Miyazaki; "Determining WWW User Agents from Server Access Log"; Jul. 2000, *IEEE, Seventh International Conference on Parallel and Distributed Computing*, pp. 173-178.

Sentor MSS AB; "Prevent Data Scraping with Sentor's ASSASSIN"; Located at http://www.sentor.se/en/assassin.html, 2007.

Sentor MSS AB; "Stop Scraping to Protect Your Data"; located at http://blockscraping.com/prevent-scraping.html, 2007.

Tanaka, Kiyofumi and Tomoharu Fukuwa; "Highly Functional Memory Architecture for Large-Scale Data Applications"; Jan. 14, 2004, *IEEE Computer Society, Proceedings of the Innovative Architecture for Future Generation High-Performance Procesors and Systems*; pp. 1-10.

Wikimedia Foundation, Inc.; "Web Scraping" located at http://en.wikipedia.org/wiki/Web_scraping, Jan. 8, 2008.

Office Action dated Jan. 11, 2012, issued in U.S. Appl. No. 12/122,598, filed May 16, 2008; 25 pages.

Office Action dated Feb. 1, 2013, issued in U.S. Appl. No. 12/122,598, filed May 16, 2008; 30 pages.

Allowance dated Jul. 26, 2013, issued in U.S. Appl. No. 12/122,598, filed May 16, 2008; 19 pages.

* cited by examiner

| IP Address 141 | User Agent 143 | User Account 145 | Timestamp 147 | ... | Data Accessed 149 |
|---|---|---|---|---|---|
| | | | ⋮ | | |

SYSTEMS AND METHODS TO CONTROL WEB SCRAPING

CROSS-REFERENCE TO RELATED APPLICATIONS

The present application is a continuation of U.S. patent application Ser. No. 12/122,598, filed May 16, 2008, the disclosure of which is incorporated herein by reference.

FIELD OF THE TECHNOLOGY

At least some embodiments disclosed herein relate to control of web access in general and, particularly but not limited to, identification and control of web scraping activities.

BACKGROUND

Web scraping generally includes activities to extract data or content from a website through manual or automated processes. The extracted data may be used in various ways, including indexing the website to facilitate search, using the extracted data to run a separate website or to power a separate application, etc. In some cases, the data may be sold to third parties or used by a competitor for analysis, often without attribution to the originator.

While some friendly web scraping activities are welcome, some web scraping activities are damaging to the website. For example, a search engine may use an automated software tool, called a bot, to automatically visit various web pages of the website to index the web pages. When a user searches the web using the search engine, the index information can be used to determine whether there is a match between the web pages and the user search request. The search result of the search engine can direct the user to the web pages if the web pages match the search requests. Since the search engine is helpful in driving web traffic to the website, the web scraping activities by the search engine are generally welcome.

However, a scraper may use the extracted data to set up a scraper site, which serves its users using the data extracted through web scraping without referring the users to the original website. This or any other unauthorized use of the data by a web scraper is generally not welcome.

Web scraping may also overload the website, causing degradation in response performance for regular users of the website.

There are some techniques to stop or slow a bot. For example, if known, the IP address of the bot can be blocked to prevent further access by the bot. For example, bots may be blocked using tools that automatically determine whether there is real person behind the request, such as "Completely Automated Public Turing test to tell Computers and Humans Apart" (CAPTCHA) tests.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
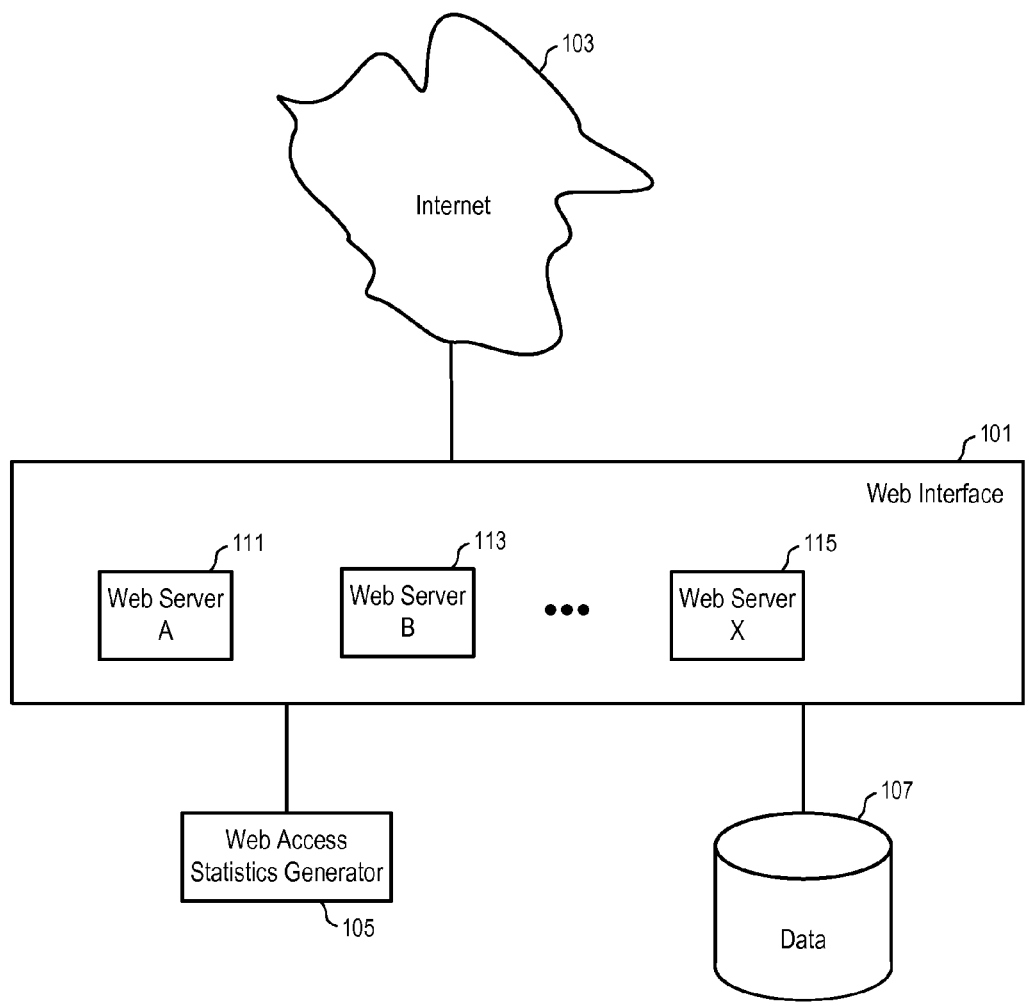
FIG. 1 shows a system to deter web scraping according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

One embodiment of the disclosure provides a system to identify and control web scraping using a centralized system to log and compile web access statistics for a web interface that has a plurality of web servers. In one embodiment, the centralized system to log and compile web access statistics is implemented via, at least in part, a set of memory sharing processes running on a set of networked computers for reduced response time.

In one embodiment, web requests received through a plurality of web servers are logged and compiled in real time to provide information on access patterns by various requesters. The real time information allows the system to identify web scrapers quickly before the web scrapers cause significant damage. The real time statistics can be used to control access to web based data in an automated way.

Although the web servers may log the web access individually, compiling the access statistics periodically from the individual log files may open an extended time window for a web scraper to extract a significant amount of data from the database via the plurality of web servers, or to degrade the system performance for a period of time.

In one embodiment, the set of web servers provide stateless and/or sessionless web applications to support broad scalability and high performance. The web severs do not track the state of a web application (e.g., via login sessions, URL strings, browser cookies, etc.). Thus, web requests from different users can be distributed (e.g., by a load balancer or others) among the web servers for load balancing and improved response time. For example, individual servers within the set of web servers are capable to service each and every separate web requests an end user takes. For example, a search may happen on a first server connected to one data source, with the results displayed from a second server, then subsequent pages of results from a third server connected to a separate data source. However, this flexibility in delivering content may make it difficult to intercept unwanted bots. In one embodiment, a system is to log and compile the access statistics substantially in real time for the web servers to identify and block unwanted bots.

In one embodiment, the real time statistics of access patterns are used to identify excessive traffic and to minimize the impact of web scrapers on the system.

In one embodiment, a number of web servers use a single, centralized database to log web requests made by different entities. The centralized database may be implemented via one or more files controlled by operating systems, one or more storage devices controlled by a traditional relational or object oriented database manager, shared dynamic random access memory implemented on a set of computers (e.g., on the computers running the web servers and/or other computers), distributed data store, distributed cache, etc. The data of the centralized database may be hosted on a nonvolatile storage device, such as a hard disk drive, an array of hard disks, a set of networked storage devices, volatile storage devices such as random access memory of a single computer, or random access memories of a set of networked computers. The database can be implemented via a peer to peer network. The centralized database allows the web servers to individually create records, read records created by other web servers, modify records created by other web servers, as if the database were maintained by a single entity, although the centralized database can be implemented via a set of computers and/or a set of volatile/non-volatile storage devices connected over a network. The centralized database thus provides real time information about access patterns, such as the speed of requests generated by a particular user, the volume of requests generated by a particular user agent, etc.

In one embodiment, in response to a web request, a web server checks the centralized database to see whether the requester is a possible scraper (e.g., based on the volume and/or the rate of requests made in the past minute, three minutes, hour, day, etc.). If the volume or speed of the requests is above a threshold, access by the requester may be slowed or blocked, depending on whether the scraper is a known good scraper, a bad scraper, or other types of scrapers.

Different thresholds may be used for different types of web pages. For example, a search result page may have an access pattern different from a web page browsed through a list of categories. Access patterns of average users can be collected and used to determine the thresholds to detect the web scrapers.

In one embodiment, the scrapers are identified based on a combination of IP address, user agent string, and/or other information that may implicitly or explicitly revealing certain aspect of the user, etc. For example, in some embodiments, the user may be required to log in a user account to access data or content. For example, a user may be asked to register or sign in after a predetermined number of requests are made without logging into an account.

In one embodiment, a web request is granted, delayed, temporarily blocked, or permanently blocked (e.g., put on a black list), based on the real time information and a set of predetermined policy. For example, if the requester is determined to be a friendly scraper, the web server may provide the content in a friendly, efficient way, but provided in a rate without degrading the experiences of other users. If the requester is determined to be a bot, the web server may selectively provide or not provide certain information/content of the web page. For example, when a web page is visited by a bot of a search engine, dynamic content and graphical contents and/or advertisements may not be presented, while relevant keywords can be added.

FIG. 1 shows a system to deter web scraping according to one embodiment. In FIG. 1, a web interface (101) is provided to allow users (requesters) to access data (107) over Internet (103). The web interface (101) includes a plurality of web servers (111, 113, . . . , 115) to serve a large number of users. Some of the users may be web scrapers.

In FIG. 1, each of the web servers (111, 113, . . . , 115) is capable to independently serve user requests using the data (107) stored in a database. In one embodiment, a centralized database provides the data (107) to the web servers (111, 113, . . . , 115) over network connections (e.g., local area network). Alternatively, more than one copy of the data may be used to improve performance. For example, a plurality of replicates of the data/content can be used to serve the web servers (111, 113, . . . , 115) in parallel. In some embodiments, each of the web servers (111, 113, . . . , 115) may have its own replicate of the data to serve user requests. In one embodiment, a distributed cache system is used to cache frequently access portions of the data (107) in the dynamic random access memory of the web servers (111, 113, . . . , 115). For example, one or more of the web servers (111, 113, . . . 155) may run one or more processes which allocate dynamic random access memory to provide storage space for caching frequently access portions of the data (107). The processes communicating over a network (e.g., a local area network) to form a shared storage space implemented on the random access memory of the corresponding web servers allocated by the processes. The processes may maintain a distributed hash table across the allocated random access memory to avoid duplication and to provide fast access to the cached data. In some embodiments, multiple databases manage and/or host the data (107), which may also be cached via a distributed cache system. In general, the methods of the disclosure can be used with various different structures of web services and thus not limited to particular implementation of the web services.

In FIG. 1, a centralized web access statistics generator (105) is used to compile real time statistics of web requests received across the web interface (101). The statistics generator (105) logs the web requests received at the web servers (111, 113, . . . , 115) and provides information indicating the access pattern of various requesters.

For example, when a web server (e.g., 111) receives a web request over the Internet (103), the web server (e.g., 111) uses the centralized web access statistics generator (105) to log the web request. The web sever (e.g., 111) may communicate with the web access statistics generator (105) via various known communicate protocols and data formats, such as Internet Protocol, Transmission Control Protocol, User Datagram Protocol, HyperText Transfer Protocol (HTTP), File Transfer Protocol (FTP), Remote Procedure Call (RPC), EXtensible Markup Language (XML), HyperText Markup Language (HTML), or via custom protocols and/or data formats. The request may be a search request, or a request to browse a predefined web page. The web requester is identified (e.g., by the generator (105), one of the web servers (111, 113, . . . , 115), or a separate computer not shown in FIG. 1); and the statistics of web requests made by the web requester via the entire web interface can be obtained using the system as shown in FIG. 1 in real time. The statistics can include not only the requests made via the particular web server (e.g., 111) but also the requests made via other web servers (e.g., 113, . . . , 115). The statistics can also include the requests made up to the current request received at the web server (e.g., 111). Thus, the real time statistics can provide accurate and prompt information on web access patterns of the requester, without a time lag which might exclude certain requests made within the most recent period of time.

In FIG. 1, the real time statistics provided by the generator (105) allows a controller (e.g., the generator (105), one of the web servers (111, 113, . . . , 115), or a separate computer not shown in FIG. 1) to identify web scrapers and their usage of the system. Based on the real time statistics, the controller can selectively block certain web scrapers, slow the rate of access by certain web scrapers, and prioritize the responses to other users.

For example, when a requester has a request rate above a threshold (e.g., 15 requests per minute), the requester may be identified (e.g., by the generator (105), one of the web servers (111, 113, . . . , 115), or a separate computer not shown in FIG. 1) as a potential web scraper. To deter web scraping, the requester may be asked (e.g., by a controller, such as the generator (105), one of the web servers (111, 113, . . . , 115), or a separate computer not shown in FIG. 1) to register or log into a user account, be presented with a "Completely Automated Public Turing test to tell Computers and Humans Apart" (CAPTCHA) tests, etc. The responses to the requests from the requester may be delayed (e.g., by a controller such as the generator (105), one of the web servers (111, 113, . . . , 115), or a separate computer not shown in FIG. 1) to control the request rate. For example, a controller (e.g., the generator (105), one of the web servers (111, 113, . . . , 115), or a separate computer not shown in FIG. 1) may delay the processing of the request (e.g., using a timer, a queue, etc.). For example, one of the computers that is involved in the processing of the request may forward the request to a dedicated server to slow the processing of the request. For example, after a controller identifies the request that is associated with possible web scraping activities, the controller can forward the request to a dedicated server for delayed response, or to attach a message to the request to cause a subsequent computer which processes the request to delay the processing of the request (e.g., for a predetermined period of time, or a period of time determined based on the current workload and/or a set of rules).

For example, when a requester has a high request rate (e.g., above 30 requests per minute), the requester may be identified by a controller (e.g., the generator (105), one of the web servers (111, 113, . . . , 115), or a separate computer not shown in FIG. 1) as a software based web scraper. To deter web scraping, the requests from the requester may be delayed or temporarily blocked (e.g., by the generator (105), one of the web servers (111, 113, . . . , 115), or a separate computer not shown in FIG. 1). In some embodiments, software based web scrapers may be permitted by the system (e.g., via the control by the generator (105), one of the web servers (111, 113, . . . , 115), or a separate computer not shown in FIG. 1) in some circumstances (e.g., when the requester is a bot from a search engine), but the rate of the access is controlled by the system (e.g., via the generator (105), one of the web servers (111, 113, . . . , 115), or a separate computer not shown in FIG. 1) through delaying the responses to the requests, and/or lowering the priority of the requests.

In one embodiment, the real time statistics can be used (e.g., by the generator (105), one of the web servers (111, 113, . . . , 115), or a separate computer not shown in FIG. 1) to prioritize the responses to different requests. For example, when a request is identified by a controller (e.g., the generator (105), one of the web servers (111, 113, . . . , 115), or a separate computer not shown in FIG. 1) as being from a new requester, or a requester that has a slow rate of requests, or a requester that has only a few requests in a past period of time, the request can be assigned by the controller (e.g., the generator (105), one of the web servers (111, 113, . . . , 115), or a separate computer not shown in FIG. 1) a priority high than requests from high volume and/or high rate requesters.

In one embodiment, the real time statistics not only includes the rate and volume of the requests but also the pattern of data that is being accessed. For example, the real time statistics may include a count of unique data entries requested by a requester over a period of time. A web scraper may attempt to extract the data by visiting extensive areas of the data without an apparent area of interest. When such a web scraper is not on a list of pre-identified friendly scrapers, the web scraper may be identified by a controller (e.g., the generator (105), one of the web servers (111, 113, . . . , 115), or a separate computer not shown in FIG. 1) for blocking (e.g., by the controller). Blocking can be achieved via the controller not responding to a message related to the request, a web server not responding to the web request, or redirecting the web request to a dedicated server to provide a message indicating that the request is blocked.

Figures 2, 3:
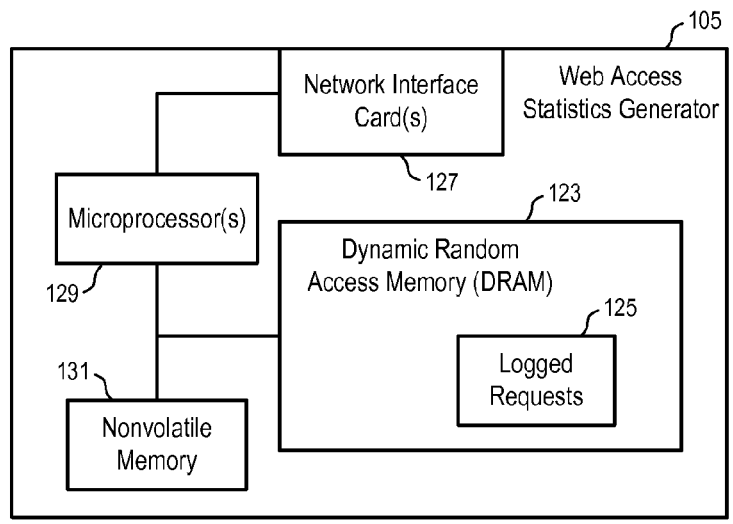
FIG. 2 shows a web access statistics generator according to one embodiment.
FIG. 3 shows an example of entries logged according to one embodiment.

FIG. 2 shows the web access statistics generator (105) according to one embodiment. In FIG. 2, the statistics generator (105) includes a set of one or more network interface cards (127) to communicate with the web servers (111, 113, . . . , 115) over a network (e.g., a local area network). The generator (105) includes one or more microprocessors (129) to process the requests from the web servers (111, 113, . . . , 115) and to store logged requests (125) in a dynamic random access memory (DRAM) (123). The DRAM (123) is typically a volatile memory that supports fast read and write accesses.

In one embodiment, at least the most recent requests (125) are logged by the generator (105) in a database hosted in the dynamic random access memory (DRAM) (123). This arrangement allows the generator (105) to generate real time statistics for most recent accesses (e.g., within the last a minute, 5 minutes, 15 minutes, 1 hour, etc.) with reduced delays in responding to web requests.

In one embodiment, the logged entries are removed by the generator (105) from the dynamic random access memory (DRAM) after a period of time to make room for current requests. For example, the logged requests (125) can be moved by the generator (105) from the DRAM into the nonvolatile memory (131) for storage. Alternatively, the requesters are logged by the generator (105) into the nonvolatile memory (131) and the DRAM (123) in parallel; and in the DRAM (123) the entries for the older requests are overwritten by the entries for the new requests.

In one embodiment, the dynamic random access memory (DRAM) (123) resides on a single computer. Alternatively, the dynamic random access memory (DRAM) (123) may reside on a set of networked computers (e.g., via a distributed cache system). For example, in one embodiment, a memory sharing process runs on a computer to allocate a portion of the dynamic random access memory (DRAM) of the computer to store a portion of the logged requests (125). Multiple memory sharing processes run on one or more computers to store different portions of the logged requests (125). The memory sharing processes communicate with each other to serve requests to create a record, to modify a record and/or to read a record. In one embodiment, each of the memory sharing processes is capable to receive an access request (e.g., to create, modify and/or read). When the record is not in the dynamic random access memory allocated in the memory sharing process which received the request, the memory sharing process communicates with other memory sharing processes to locate the process that hosts the record. In one embodiment, the memory sharing processes run on at least some of the computers that host the web servers. To access the logged requests (125) the web servers can communicate with the corresponding processes running on the computers on which the corresponding web servers are hosted. When the records are hosted on the corresponding memory sharing processes, the memory sharing processes separately serves the requests, as if the web servers were using their own memory sharing processes to access the logged requests (125) independently from each other. However, when the requested records are not in the memory sharing processes that directly receive the requests, the memory sharing processes communicate with each other to locate the records, as if the memory allocated by other memory sharing processes were a virtual memory of a memory sharing process. In one embodiment, a distributed cache system is used to both cache the frequently access portion of data (107) and to log web access request to detect unwanted web scraping activities.

FIG. 3 shows an example of entries logged according to one embodiment. In FIG. 3, an entry for a logged request includes a plurality of fields, such as IP address (141) of the requester, user agent (143) of the requester, user account (145) of the requester, timestamp (147) of the request, etc. More or less fields can be logged by the generator (105) in different embodiments. In one embodiment, the fields (e.g., 141, 143, 145, 147, . . . ) are separately stored in a database. In another embodiment, at least some of the fields (e.g., 141, 143, 145, 147) concatenated to generate a hash (SHA1/MD5) signature for each unique user and stored in the database is a simple name:value pair, such as $USER_HASH: $COUNTER, where $USER_HASH represents the identity of the user; and $COUNTER represents the number of requests made by the user in a predetermined period of time (e.g., one minute). Upon expiration of the predetermined period of time, the database can be purged (e.g., to remove all records generated in the prior time period) to start counting for the next time period.

In one embodiment, a requester is identified (e.g., by the generator (105), one of the web servers (111, 113, . . . , 115), or a separate computer not shown in FIG. 1) based on at least the IP address (141) and the user agent (143). An identification of the user agent (143) is determined (e.g., by the generator (105), one of the web servers (111, 113, . . . , 115), or a separate computer not shown in FIG. 1) based on a user agent string presented in the web request (e.g., a HyperText Transfer Protocol (HTTP) request). Certain web scrapers can be identified (e.g., by the generator (105), one of the web servers (111, 113, . . . , 115), or a separate computer not shown in FIG. 1) based on the IP address and the user agent information extracted from the HTTP request. In some embodiments, the user is required to register or log into a user account to access the premium data content; and the user account (145) can be used (e.g., by the generator (105), one of the web servers (111, 113, . . . , 115), or a separate computer not shown in FIG. 1) to more precisely identify the requester. However, in some embodiments, a user may not be required to register or sign into a user account to view certain content. For example, a user may not be required (e.g., by the generator (105), one of the web servers (111, 113, . . . , 115), or a separate computer not shown in FIG. 1) to have a user account to search an Internet Yellow page for a listing of certain businesses. In some embodiments, when the system (e.g., via the generator (105), one of the web servers (111, 113, . . . , 115), or a separate computer not shown in FIG. 1) determines that the user may be a potential web scraper (e.g., based on real time access statistics), the user may be required (e.g., by the generator (105), one of the web servers (111, 113, . . . , 115), or a separate computer not shown in FIG. 1) to register.

In one embodiment, the entry further includes indication of data accessed (149) by the requester, which may include an indication of the data entry presented in response to the request, an indication of a category of the data access, a keyword of the data accessed, etc. Information for the data accessed may be provided by the web server after the web server processes the web request and prepares the data for the response.

Other fields can also be included in the entry of the logged requests. For example, the entries may include the keywords used in search request, a referring Uniform Resource Locator (URL) of the request, the type of the request (e.g., a search request, a review page, a directory listing page, etc.), a category of the request, etc.

Figure 4:
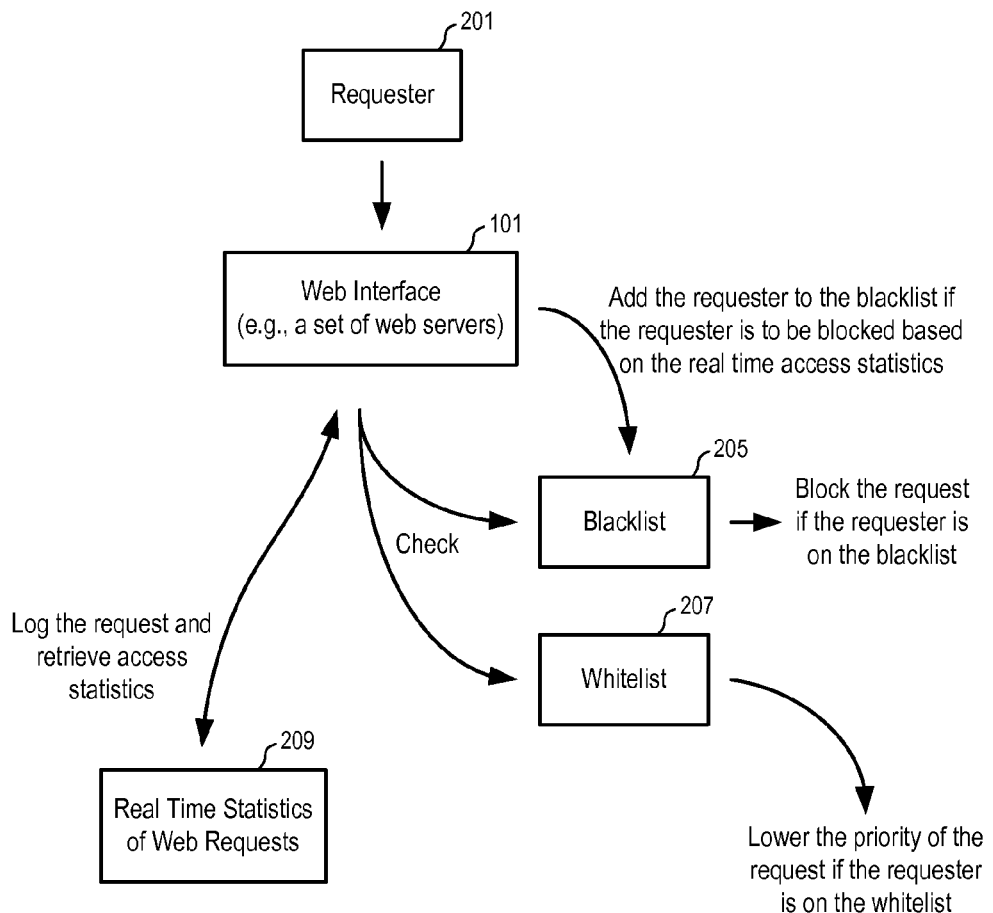
FIG. 4 illustrates a process to control web scraping according to one embodiment.

FIG. 4 illustrates a process to control web scraping according to one embodiment. In one embodiment, the process uses the system illustrated in FIG. 1, the web access statistics generator (105) illustrated in FIG. 2, and/or the database of logged requests illustrated in FIG. 3. In FIG. 4, after a requester (201) sends a web request (e.g., via Internet (103)) to a web interface (101) that has a plurality of web servers (e.g., 111, 113, . . . , 115), the system (e.g., the web servers (111, 113, . . . , 115), the web access statistics generator 105), a server hosting the data (107), or a computer not shown in FIG. 1) identifies the requester (201) and checks the blacklist (205) and the whitelist (207).

If the requester is on the blacklist (205), the web request is blocked (e.g., by a controller, such as the web servers (111, 113, . . . , 115), the web access statistics generator 105), a server hosting the data (107), or a computer not shown in FIG. 1). If the requester is on a whitelist (207), the web request is assigned (e.g., by a controller, such as the web servers (111, 113, . . . , 115), the web access statistics generator 105), a server hosting the data (107), or a computer not shown in FIG. 1) a priority lower than the request of a typical user.

In FIG. 4, the web interface (101) provides the request to a centralized database (e.g., hosted on the generator (105) illustrated in FIG. 2), which logs the request and provides real time access statistics (209) about the requester (201). Based on the real time statistics (209), the web interface (101) may add the requester to the blacklist if the requester is to be blocked. The response to the web request may be delayed by the web interface (101) to slow the access rate by the requester, when the rate of the requests from the requester is above a threshold, which may be selected by a system designer based on the type of the request. The statistics of the average rate of web requests of different types and/or categories can be used (e.g., by the system designer or the web interface (101)) to determine the thresholds for the corresponding types or categories.

Figure 5:
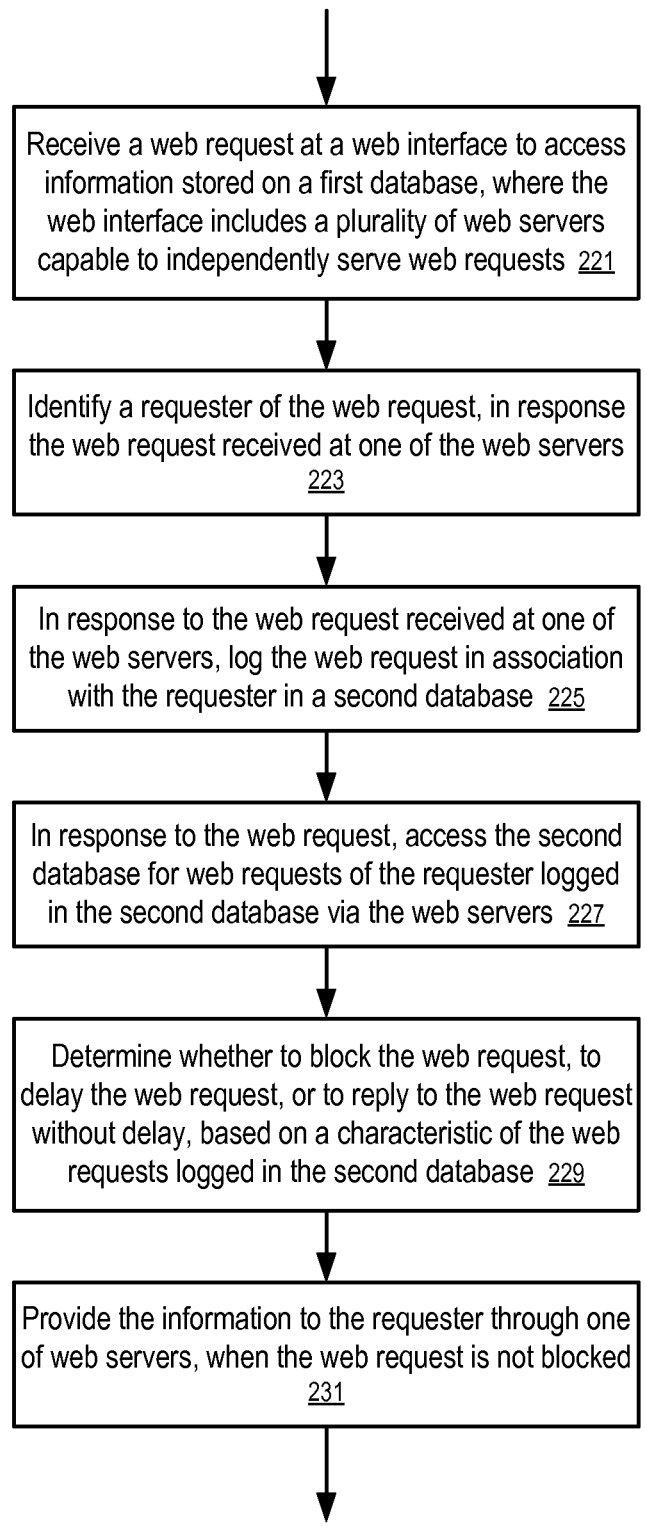
FIG. 5 shows a method to control web scraping according to one embodiment.

FIG. 5 shows a method to control web scraping according to one embodiment. In one embodiment, the method uses the system illustrated in FIG. 1, the web access statistics generator (105) illustrated in FIG. 2, and/or the database of logged requests illustrated in FIG. 3. In FIG. 5, a web request (e.g., from requester (201) via Internet (103)) is received (221) at a web interface (101) to access information stored on a first database. The web interface (101) includes a plurality of web servers (111, 113, . . . , 115) capable to independently serve web requests. In response the web request received at one of the web servers (e.g., 111, 113, . . . , or 115), a requester (e.g., 201) of the web request is identified (223) (e.g., by the web servers (111, 113, . . . , 115), the web access statistics generator 105), a server hosting the data (107), or a computer not shown in FIG. 1); the web request is logged (225) by the web access statistics generator (105) shown in FIG. 2, in association with the requester in a second database (e.g., according to the data structure illustrated in FIG. 3); and the second database is accessed (227), via the generator (105), for web requests of the requester that were logged, by the generator (105) in the second database and that were received via the web servers. The generator (105) may log the web requests separately, or collectively log the web requests by count the number of web requests in a predetermined period of time. Based on a characteristic of the web requests logged in the second database, whether to block the web request, to delay the web request, or to reply to the web request without delay is determined (229) by a controller (e.g., the web servers (111, 113, . . . , 115), the web access statistics generator 105), a server hosting the data (107), or a computer not shown in FIG. 1). When the web request is not blocked by the controller (e.g., the web servers (111, 113, . . . , 115), the web access statistics generator 105), a server hosting the data (107), or a computer not shown in FIG. 1), the information requested is provided (231) by one of web servers to the requester (e.g., 201).

In one embodiment, the characteristic of the web requests logged in the second database is based on a count of web requests within a predetermined period of time from the web request, or an average speed of web requests generated by the requester.

In one embodiment, the second database provides real time statistics on web requests received at the plurality of web servers.

In one embodiment, each of the web servers logs received web requests in the second database; and each of the web servers obtains real time statistics of web requests received across the plurality of web servers to determine whether the requester is a web scraper.

In one embodiment, after a category of the web request is determined, a threshold is selected based on the category of the web request; and whether the requester is a web scraper is determined based on whether the characteristic of the web requests exceeds a threshold.

In one embodiment, whether the requester is a known, friendly scraper is determined based on the identification information (e.g., an Internet address and an identification of user agent, which can be determined from a user agent string extracted from the web request); and when the requester is a friendly scraper, whether to slow the request is determined based on current workload of the web interface and/or the characteristic of the web requests.

In one embodiment, whether the requester is a known scraper or an end user is determined based at least in part on the real time statistics; and a format is selected to provide the information based on whether the requester is a known scraper or an end user.

In one embodiment, accessing of the second database for the web requests of the requester logged in the second database includes counting the web requests of the requester logged in the second database by the web servers within a predetermined period of time prior to the web request.

In one embodiment, the second database is implemented in a dynamic random access memory of a computer; and entries of logged web requests are removed from the second database when the entries are logged prior to a predetermined period of time. The removed entries may be removed from the dynamic random access memory and stored into a non-volatile memory.

In one embodiment, a list of identification information of a plurality of first web scrapers are maintained; a rate of responses to web requests from the first web scrapers are regulated based on real time statistics of web requests logged in the second database; a list of identification information of a plurality of second web scrapers are maintained; and web requests from the second web scrapers are blocked.

Figure 6:
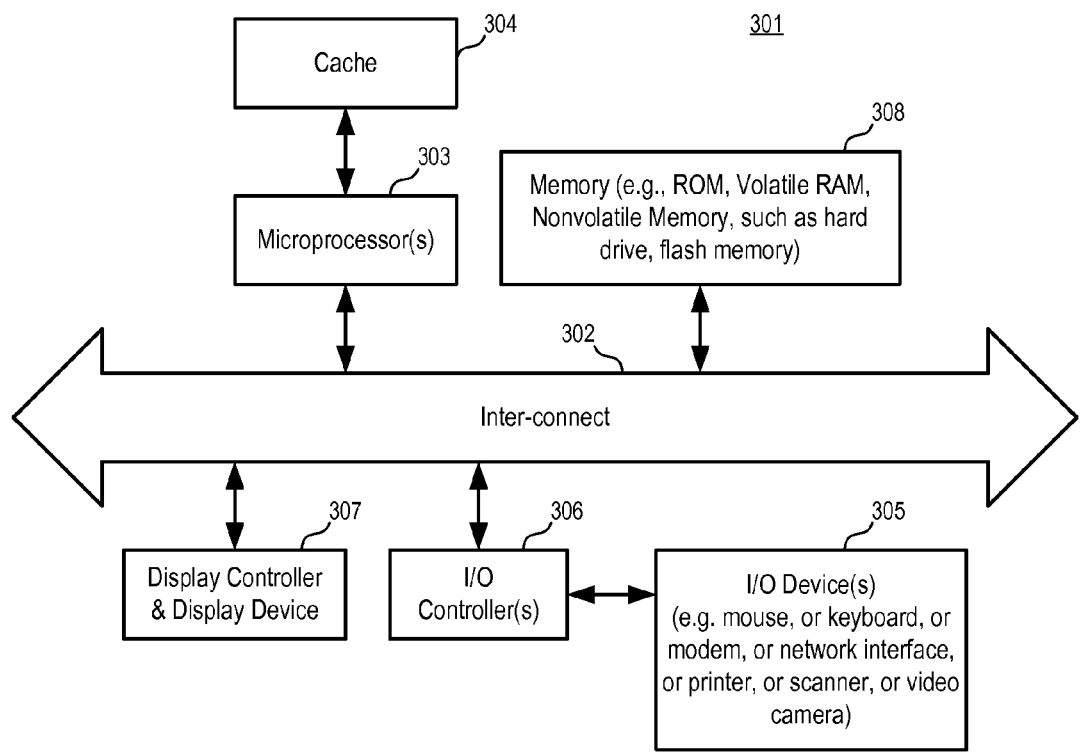
FIG. 6 illustrates a data processing system which can be used in various embodiments.

FIG. 6 illustrates a data processing system which can be used in various embodiments. While FIG. 6 illustrates various components of a computer system, it is not intended to represent any particular architecture or manner of interconnecting the components. Other systems that have fewer or more components may also be used.

In one embodiment, a server data processing system as illustrated in FIG. 6 is used as one of the web server(s) (e.g., 111, 113, . . . , 115), web access statistics generator (105), database server(s) (e.g., for hosting data (107)), etc. In some embodiments, one or more servers of the system can be replaced (e.g., by a system designer) with the service of a peer to peer network of a plurality of data processing systems, or a network of distributed computing system. The peer to peer network, or a distributed computing system, can be collectively viewed (e.g., by the reader of the description) as a server data processing system.

In FIG. 6, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 6.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is used a server system, some of the I/O devices, such as printer, scanner, mice, keyboards are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   one or more network interfaces accessible from a network;
   one or more repositories to retain one or more of:
      web content;
      requester identification information; and/or
      web request history information;
   one or more processors coupled to at least one of the one or more network interfaces and to at least one of the one or more repositories, the one or more processors to execute instructions to:
      process a current web request that is received via the network and corresponds to a request for information;
      determine a request category corresponding to the current web request based at least in part on a type of data access corresponding to the current web request;
      determine a threshold based on the request category of the current web request, wherein the threshold is from a plurality of thresholds, each of which thresholds corresponds to a respective request category of web requests;
      determine identification information indicating a requester of the current web request;
      log the current web request in association with the requester;
      process information on past web requests of the requester to identify a characteristic of the past web requests;
      determine whether the requester of the current web request is a web scraper based on whether the characteristic of the past web requests exceeds the threshold;
      provide types of processing to handle the current web request wherein the provided types of processing include at least blocking, delaying, timely replying, and prioritizing a response to the current web request:
      determine a type of processing based on the determining whether the requester of the current web request is a web scraper; and
      handle the current web request based on the type of processing wherein (a) blocking comprises not responding to the current web request, (b) delaying comprises postponing a response to the current web request for a predetermined period of time, (c) timely replying comprises providing a timely response to the current web request, and (d) prioritizing comprises indicating a priority for a response to the current web request.

2. The system of claim 1, wherein the determining the request category corresponding to the current web request comprises:

characterizing the current web request as corresponding to a type of web request based on a type of information requested.

3. The system of claim 1, wherein the threshold is based at least in part on access pattern information for web requests corresponding to the category of the current web request.

4. The system of claim 3, wherein the web requests correspond to a type of web page requested.

5. The system of claim 1, wherein the prioritizing further comprises:
characterizing the current web request as corresponding to a type of web request based on a type of information requested.

6. The system of claim 1, wherein the one or more processors are to further execute instructions to:
determine whether the requester is a friendly scraper.

7. The system of claim 6, wherein the one or more processors are to further execute instructions to:
consequent to a determination that the requester is a friendly scraper, determine the type of processing based on a priority of a second requester that is not determined to be a web scraper.

8. The system of claim 7, wherein the second requester that is not determined to be a web scraper is determined to correspond to a newly identified requester.

9. The system of claim 7, wherein the second requester that is not determined to be a web scraper is determined to have a low request rate and/or a low number of requests.

10. A method comprising:
processing a current web request that is received via the Internet and corresponds to a request for information retained in one or more repositories;
determining a request category corresponding to the current web request based at least in part on a type of data access corresponding to the current web request;
determining a threshold based on the request category of the current web request, wherein the threshold is from a plurality of thresholds, each of which thresholds corresponds to a respective request category of web requests;
determining identification information indicating a requester of the current web request;
logging the current web request in association with the requester;
processing information on past web requests of the requester to identify a characteristic of the past web requests;
determining whether the requester of the current web request is a web scraper based on whether the characteristic of the past web requests exceeds the threshold;
providing types of processing to handle the current web request wherein the provided types of processing include at least blocking, delaying, timely replying, and prioritizing a response to the current web request;
determining a type of processing based on the determining whether the requester of the current web request is a web scraper; and
handling the current web request based on the type of processing wherein (a) blocking comprises not responding to the current web request, (b) delaying comprises postponing a response to the current web request for a predetermined period of time, (c) timely replying comprises providing a timely response to the current web request, and (d) prioritizing comprises indicating a priority for a response to the current web request.

11. The method of claim 10, wherein the determining the request category corresponding to the current web request comprises:
characterizing the current web request as corresponding to a type of web request based on a type of information requested.

12. The method of claim 10, wherein the threshold is based at least in part on access pattern information for web requests corresponding to the category of the current web request.

13. The method of claim 12, wherein the web requests correspond to a type of web page requested.

14. The method of claim 10, wherein the prioritizing further comprises:
characterizing the current web request as corresponding to a type of web request based on a type of information requested.

15. The method of claim 10, further comprising:
determining whether the requester is a friendly scraper;
consequent to a determination that the requester is a friendly scraper, determining the type of processing based on a priority of a second requester that is not determined to be a web scraper.

16. The method of claim 15, wherein the second requester that is not determined to be a web scraper is determined to correspond to a newly identified requester, to a low request rate, and/or to a low number of requests.

17. A non-transitory machine-readable medium having machine-readable instructions thereon, which instructions, when executed by one or more computers or other processing devices, cause the one or more one or more computers or other processing devices to:
process a current web request that is received via the network and corresponds to a request for information;
determine a request category corresponding to the current web request based at least in part on a type of data access corresponding to the current web request;
determine a threshold based on the request category of the current web request, wherein the threshold is from a plurality of thresholds, each of which thresholds corresponds to a respective request category of web requests;
determine identification information indicating a requester of the current web request;
log the current web request in association with the requester;
process information on past web requests of the requester to identify a characteristic of the past web requests;
determine whether the requester of the current web request is a web scraper based on whether the characteristic of the past web requests exceeds the threshold;
provide types of processing to handle the current web request wherein the provided types of processing include at least blocking, delaying, timely replying, and prioritizing a response to the current web request:
determine a type of processing based on the determining whether the requester of the current web request is a web scraper; and
handle the current web request based on the type of processing wherein (a) blocking comprises not responding to the current web request, (b) delaying comprises postponing a response to the current web request for a predetermined period of time, (c) timely replying comprises providing a timely response to the current web request, and (d) prioritizing comprises indicating a priority for a response to the current web request.

18. The non-transitory machine-readable medium of claim 17, wherein the determining the request category corresponding to the current web request comprises:
characterizing the current web request as corresponding to a type of web request based on a type of information requested.

19. The non-transitory machine-readable medium of claim 17, wherein the threshold is based at least in part on access pattern information for web requests corresponding to the category of the current web request.

20. The non-transitory machine-readable medium of claim 19, wherein the web requests correspond to a type of web page requested.

* * * * *